(12) United States Patent
Lichoulas et al.

(10) Patent No.: US 9,279,950 B2
(45) Date of Patent: Mar. 8, 2016

(54) EXTERIOR DISTRIBUTION PEDESTAL CABINET

(75) Inventors: Ted Lichoulas, Simpsonville, SC (US); Lou Guzzo, Inman, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 243 days.

(21) Appl. No.: 13/883,921

(22) PCT Filed: Mar. 28, 2012

(86) PCT No.: PCT/US2012/030889
§ 371 (c)(1),
(2), (4) Date: May 7, 2013

(87) PCT Pub. No.: WO2012/135312
PCT Pub. Date: Oct. 4, 2012

(65) Prior Publication Data
US 2013/0230291 A1    Sep. 5, 2013

Related U.S. Application Data

(60) Provisional application No. 61/468,268, filed on Mar. 28, 2011, provisional application No. 61/543,382, filed on Oct. 5, 2011.

(51) Int. Cl.
*G02B 6/44* (2006.01)
*G02B 6/38* (2006.01)
*G02B 6/28* (2006.01)

(52) U.S. Cl.
CPC .......... *G02B 6/4441* (2013.01); *G02B 6/4452* (2013.01); *G02B 6/28* (2013.01); *G02B 6/3897* (2013.01); *G02B 6/4454* (2013.01); *G02B 6/4471* (2013.01)

(58) Field of Classification Search
CPC ..................................................... G02B 6/4452
See application file for complete search history.

(56) References Cited

U.S. PATENT DOCUMENTS

| | | | | |
|---|---|---|---|---|
| 6,363,200 | B1 * | 3/2002 | Thompson et al. | 385/135 |
| 7,728,225 | B2 * | 6/2010 | Anderson et al. | 174/50 |
| 8,139,914 | B2 * | 3/2012 | Lee | 385/135 |
| 2007/0031100 | A1 | 2/2007 | Garcia et al. | |
| 2007/0047893 | A1 * | 3/2007 | Kramer et al. | 385/135 |
| 2009/0226143 | A1 | 9/2009 | Beck | |
| 2010/0046905 | A1 * | 2/2010 | Gniadek et al. | 385/135 |
| 2011/0019965 | A1 * | 1/2011 | Smith et al. | 385/135 |
| 2011/0242735 | A1 * | 10/2011 | Landry et al. | 361/622 |
| 2011/0274403 | A1 * | 11/2011 | LeBlanc et al. | 385/135 |
| 2013/0034335 | A1 * | 2/2013 | Landry et al. | 385/135 |
| 2014/0126870 | A1 * | 5/2014 | Landry et al. | 385/135 |

\* cited by examiner

*Primary Examiner* — Michelle R Connelly
(74) *Attorney, Agent, or Firm* — Sughrue Mion, PLLC

(57) ABSTRACT

An exterior distribution pedestal cabinet includes an enclosure having a top, a bottom and first and second sides extending between the top and the bottom, a door disposed on a front side of the enclosure, a cable management bracket within the enclosure, a plurality of splitter modules mounted within the enclosure at the cable management bracket, a connector holder bracket, a plurality of connector holders mounted at the connector holder bracket; and a pass-through connector adaptor plate.

14 Claims, 16 Drawing Sheets

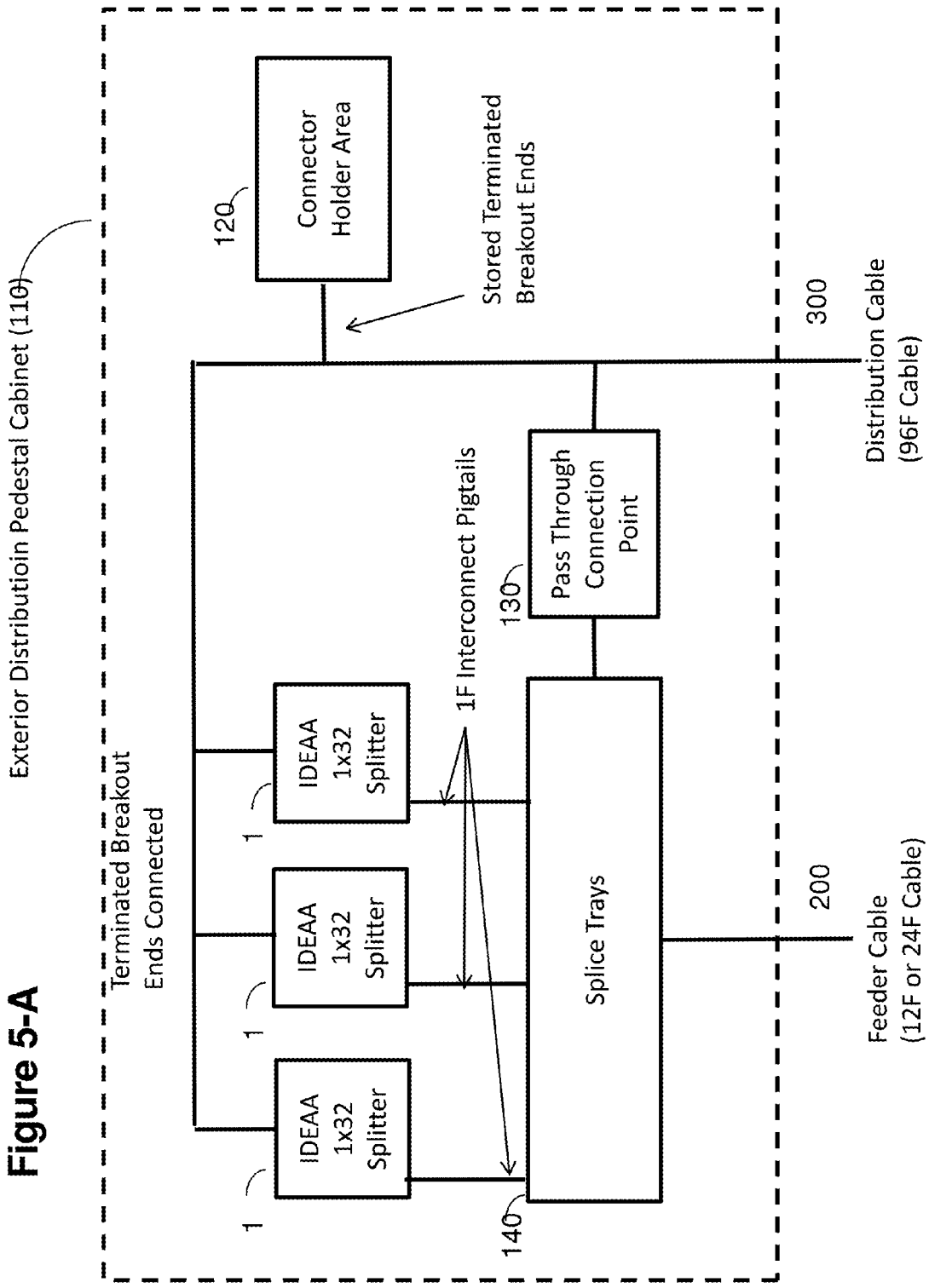
Figure 5-A

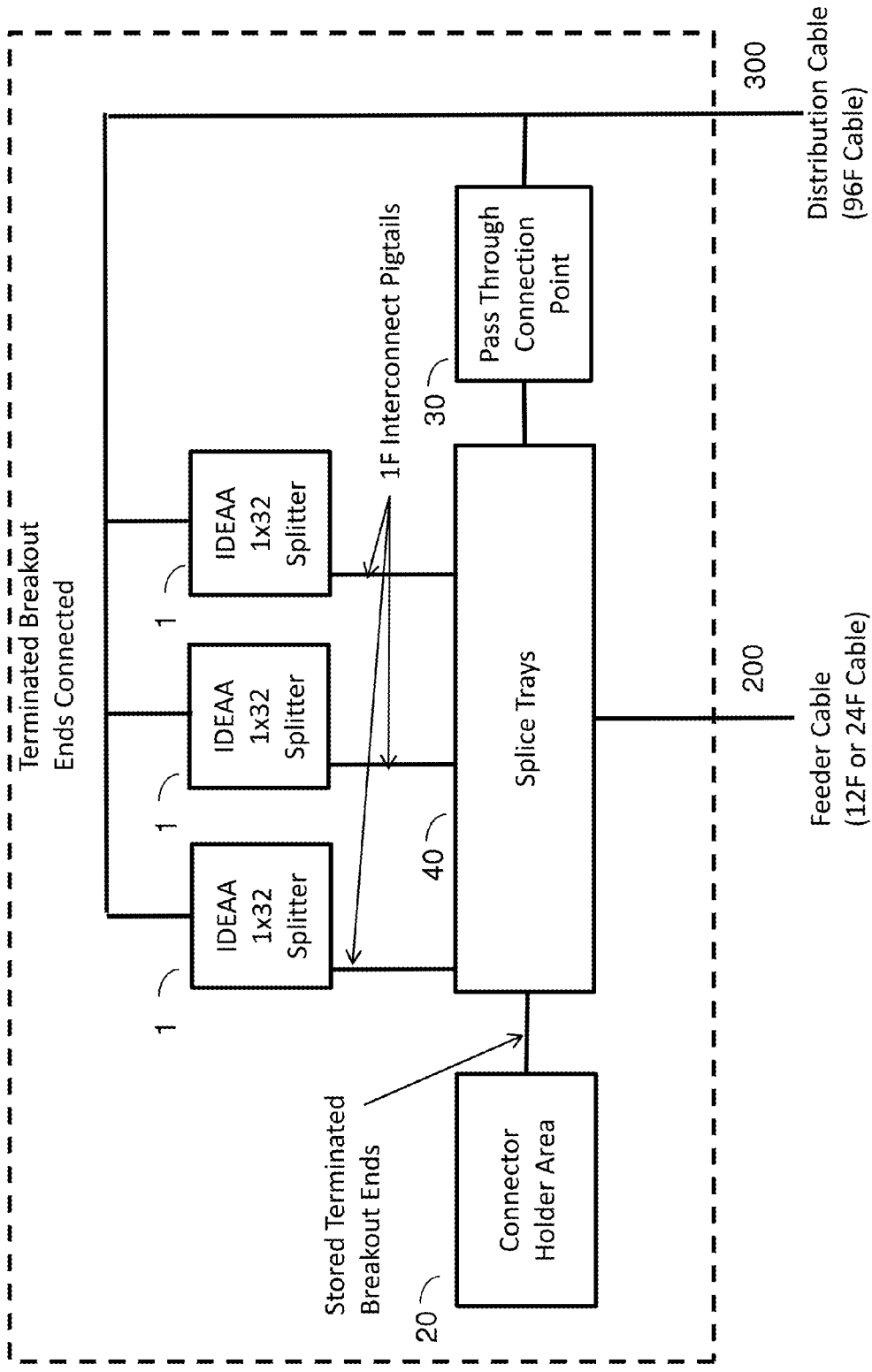

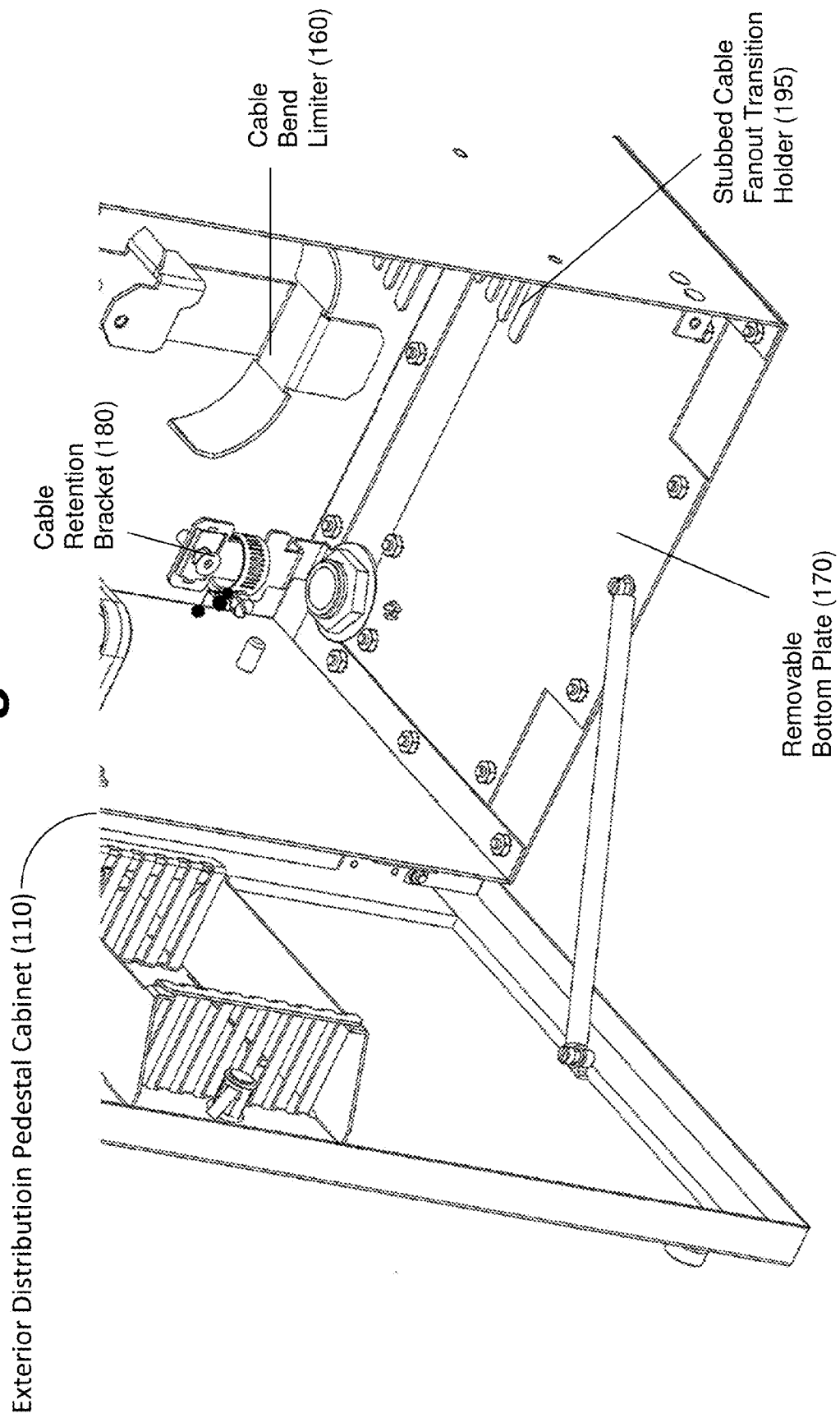

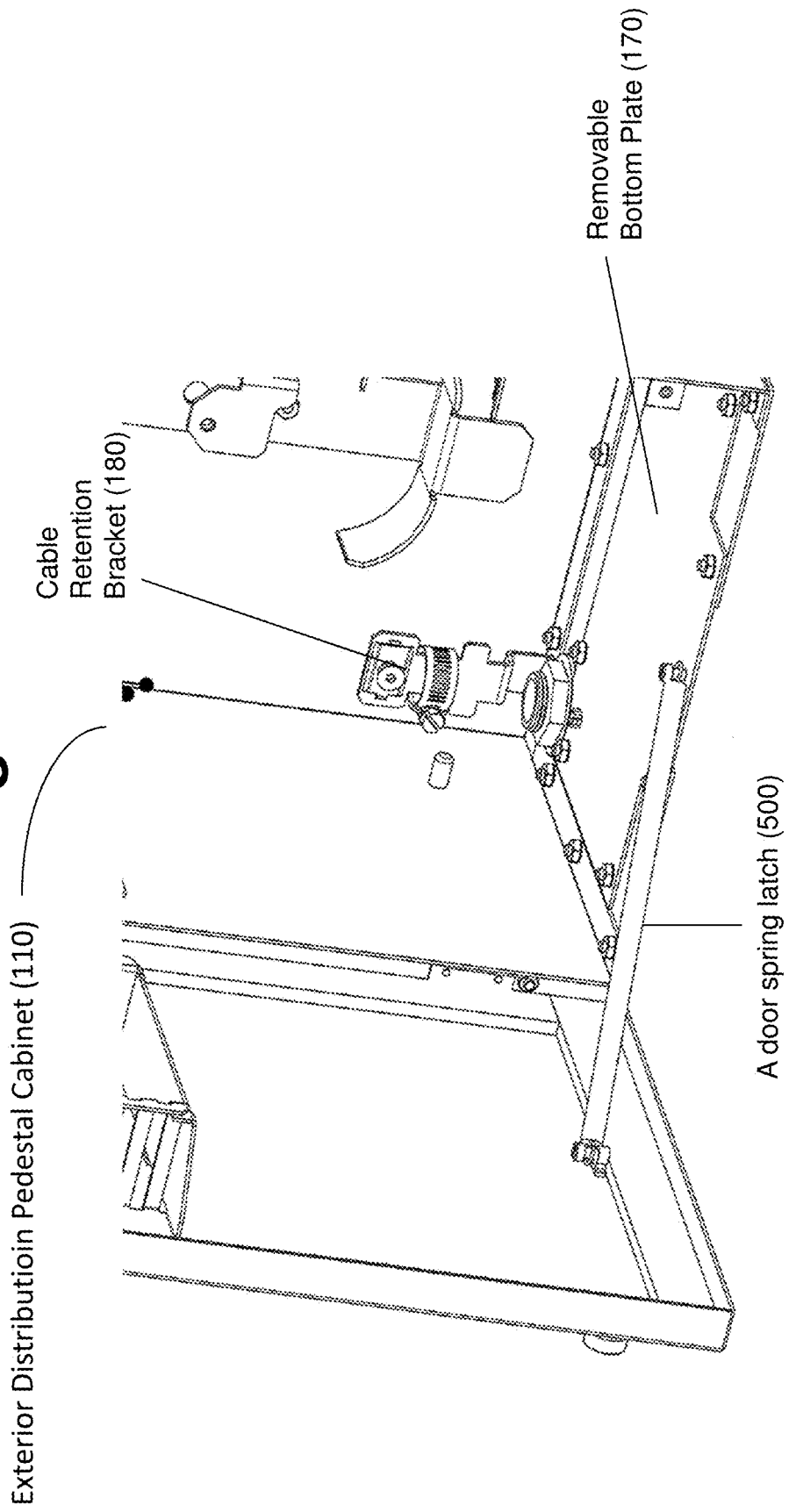

EXTERIOR DISTRIBUTION PEDESTAL CABINET

CROSS REFERENCE TO RELATED APPLICATIONS

This application is a National Stage of International Application No. PCT/US2012/030889, filed on Mar. 28, 2012, which claims priority from U.S. Patent Application No. 61/468,268, filed on Mar. 28, 2011, and 61/543,382 filed on Oct. 5, 2011, the contents of all of which are incorporated herein by reference in their entirety.

BACKGROUND

1. Field

The present invention relates generally to an optical fiber distribution cabinet for use in a passive optical network (PON), and more particularly, to an optical fiber distribution cabinet for interconnecting optical fibers of a feeder cable with optical fibers of one or more distribution cables in the outside plant of a PON.

2. Related Art

For as long as fiber optics has existed, so has fiber management. The most sophisticated networks in the world would be useless if a thin filament of glass could not be properly routed, protected and traced from its origin to its destination. A passive optical network (PON) is a point-to-multipoint, fiber to the premises network architecture in which unpowered optical splitters are used to enable a single optical fiber to serve multiple premises. The PON architecture has gained worldwide acceptance and now underlies much of the growth of the telecommunications industry.

In applications employing PON technology, the difficulties of fiber management are further complicated by optical splitters and by the challenge of managing unknown take rates. In response to this complexity, a new system for managing outside plant was developed: what is commonly known as a fiber distribution hub (FDH).

Generally, a FDH is a simple box that houses multiple optical splitters, and to which multiple subscribers are routed for connection to those splitters. The FDHs are typically designed to be installed outdoors, but recently they have also been installed indoors for vertical multiple distribution units (MDUs). The FDHs are all passive devices (no power required), and most of them can be installed on a pole, on a pad/pedestal, or on top of a vault.

Most U.S.-based PON systems use a cabinet fiber distribution hub (CFDH) or a pedestal fiber distribution hub (PFDH) along with fiber distribution splitters. Although CFDHs and PFDHs meet Telecommunication (Telco) service provider network requirements, the typical FDHs and fiber distribution hub splitters use proprietary splitters and a fixed internal cabling methodology leading to difficulty in service. These FDH splitters typically have input and output pigtails. Due to variation in FDH configuration size and configuration, it is often necessary for a Telco service provider to stock FDH splitters optimized for a specific FDH model. Also, although a fiber distribution splitter may have one package size, there are multiple cabinet fiber distribution hubs and pedestal fiber distribution hubs specific variants with differing pigtail lengths for efficient fiber routing.

With a PFDH currently available in the market, another problem often arises because the connectors in the input and output distribution field are secured behind an interior bulkhead and are more difficult to clean and inspect connectors installed behind input and output distribution fields. In addition, in some of current CFDH or PFDH designs that use F1 and F2, a separate jumper is needed to connect the feeder and distribution cables.

In servicing the FDHs, field technicians frequently need to conduct maintenance or reassign copper or fiber optic circuits in outside plant cabinets. It is desirable that these cabinets have a design feature that holds the cabinet door in an open (maintenance) position or have a design feature that allows these doors to be easily removed and reinstalled to allow the field technician free access to the cabinet interior without interference from the door. There are three common methods to secure a cabinet door in a maintenance position.

First, there is a sliding bar latch with fixed slots to hold the cabinet door in various pre-assigned positions. This approach effectively holds a door in fixed positions but requires a fixed volume within the cabinet. As a practical matter, this design approach is not suitable for small cabinets due to the comparatively large percentage of cabinet interior volume required to implement.

Second, there is a use of removable door. With this method, the cabinet door can be easily removed and re-installable. This design approach is feasible in applications where the field technician is operating at ground level and no functional components are stored on the cabinet door.

Third, a removably attachable tether is used to hold the door open. To use this approach, the field technician must be able to secure the tether to the back of the cabinet or a nearby fixed structure.

Therefore, there is a need for providing external FTTP PON hubs which provide an easy way to configure for different combinations of feeder fiber cables and distribution fiber cables, an easy way to connect service to customers, and means for pass-through connections. Additionally, there is a need for an easy way to route feeder and distribution cables to the ports in the bottom of the external hub. There is also a need for cost-effective way to secure a cabinet door utilizing a minimal cabinet space. The present invention has been made with the forgoing situations taken into consideration.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the invention is an exterior distribution pedestal cabinet may include an enclosure having a top, a bottom and first and second sides extending between the top and the bottom, a door disposed on a front side of the enclosure, a cable management bracket within the enclosure a plurality of splitter modules mounted within the enclosure at the cable management bracket a connector holder bracket, a plurality of connector holders mounted at the connector holder bracket and a pass-through connector adaptor plate, where the enclosure has a removable bottom plate.

In another embodiment of the invention, each of the plurality of splitter modules may include a housing with a splitter compartment and a splicer compartment, a plurality of fiber adapters attached to a wall of the housing, a plurality of fiber connectors connected to the plurality of fiber adapters, an optical splitter in the splitter compartment of the housing, an input fiber optically connected to the optical splitter, and a plurality of output fibers optically connected to the optical splitter and the plurality of fiber connectors.

Another embodiment of the invention includes a cable retention bracket.

Another embodiment of the invention includes a stubbed cable fanout transition holder.

Another embodiment of the invention includes a connector holder bracket hinge.

Another embodiment of the invention is a cabinet which includes the connector holder bracket, which is attached to the door.

Another embodiment of the invention is a cabinet with the connector holder bracket hinge rotatably attached to the door.

Another embodiment of the invention is a cabinet of which the connector holder bracket is attached to the connector holder bracket hinge.

Another embodiment of the invention is a cabinet of which the connector holder is mounted within the door at the connector holder bracket.

Another embodiment of the invention is a cabinet of which the pass through connector adaptor plate is disposed below the plurality of the splitter modules.

Another embodiment of the invention is a cabinet of which the connector holder comprises a transmission window.

BRIEF DESCRIPTION OF THE DRAWINGS

FIGS. 5A and 5B show a schematic of an exterior distribution pedestal cabinet.

FIG. 14 shows a front isometric view of an exterior distribution pedestal cabinet interior with a removable bottom plate attached.

FIG. 15 shows a front isometric view of an exterior distribution pedestal cabinet interior with a door spring latch.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
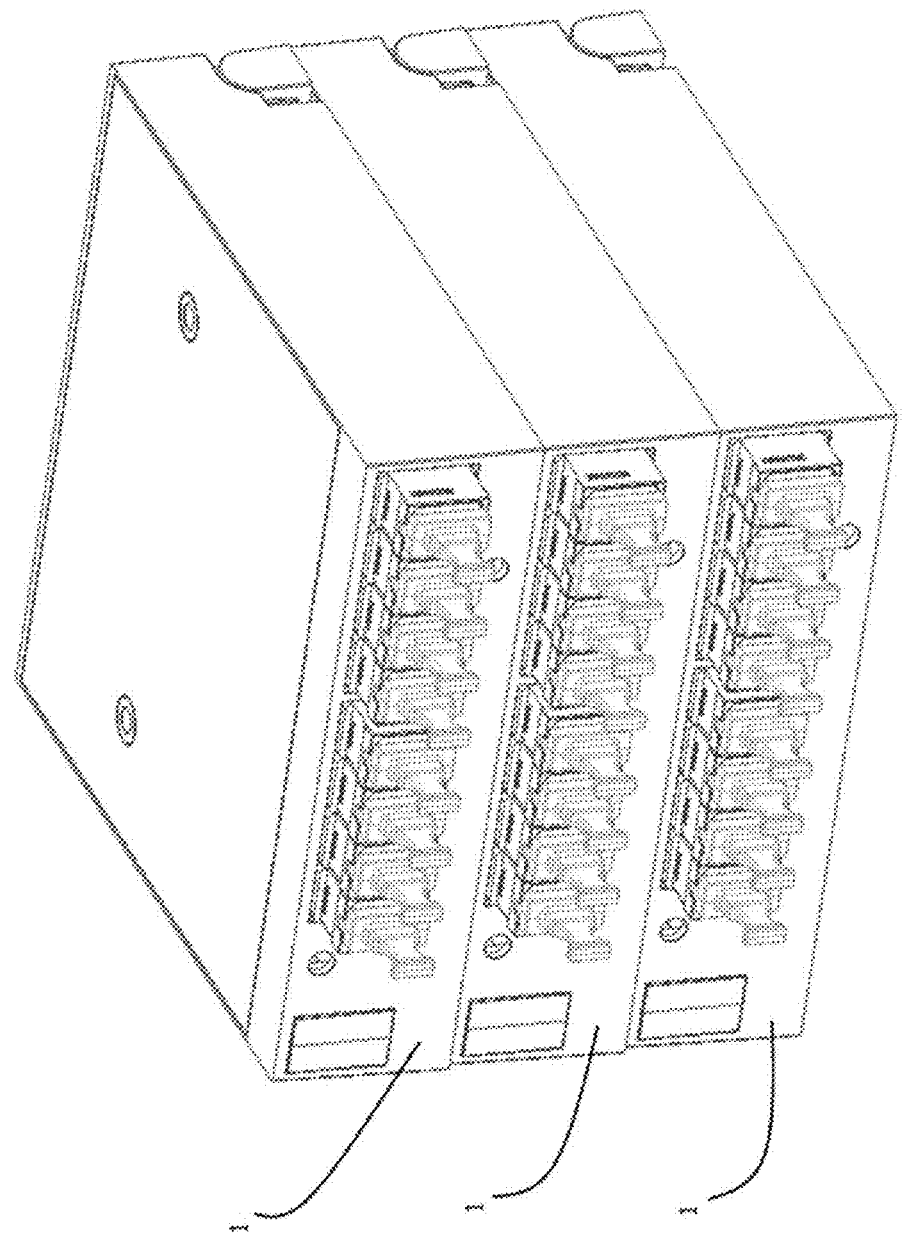
FIG. 1 shows a rear isometric view of a multiple fiber connector module of the invention.

FIG. 1 shows an isometric view of an embodiment of a multiple fiber connector version of integrated distribution enabling access apparatus (IDEAA) modules. In this embodiment three IDEAA modules 1 are stacked together. For example, FIG. 1 shows three 3×96 modules attached to each other, which makes it a 9×288 apparatus. The IDEAA modules can be attached to each with mounting hardware through holes 3 and 39 for example. As a comparison, the dimensions of this stacked 288 subscriber apparatus in FIG. 1 are approximately 3.5×4×4 inches. On the other hand the dimensions of a typical 288 subscriber FDH are approximately 25×20×20 inches.

Figure 2:
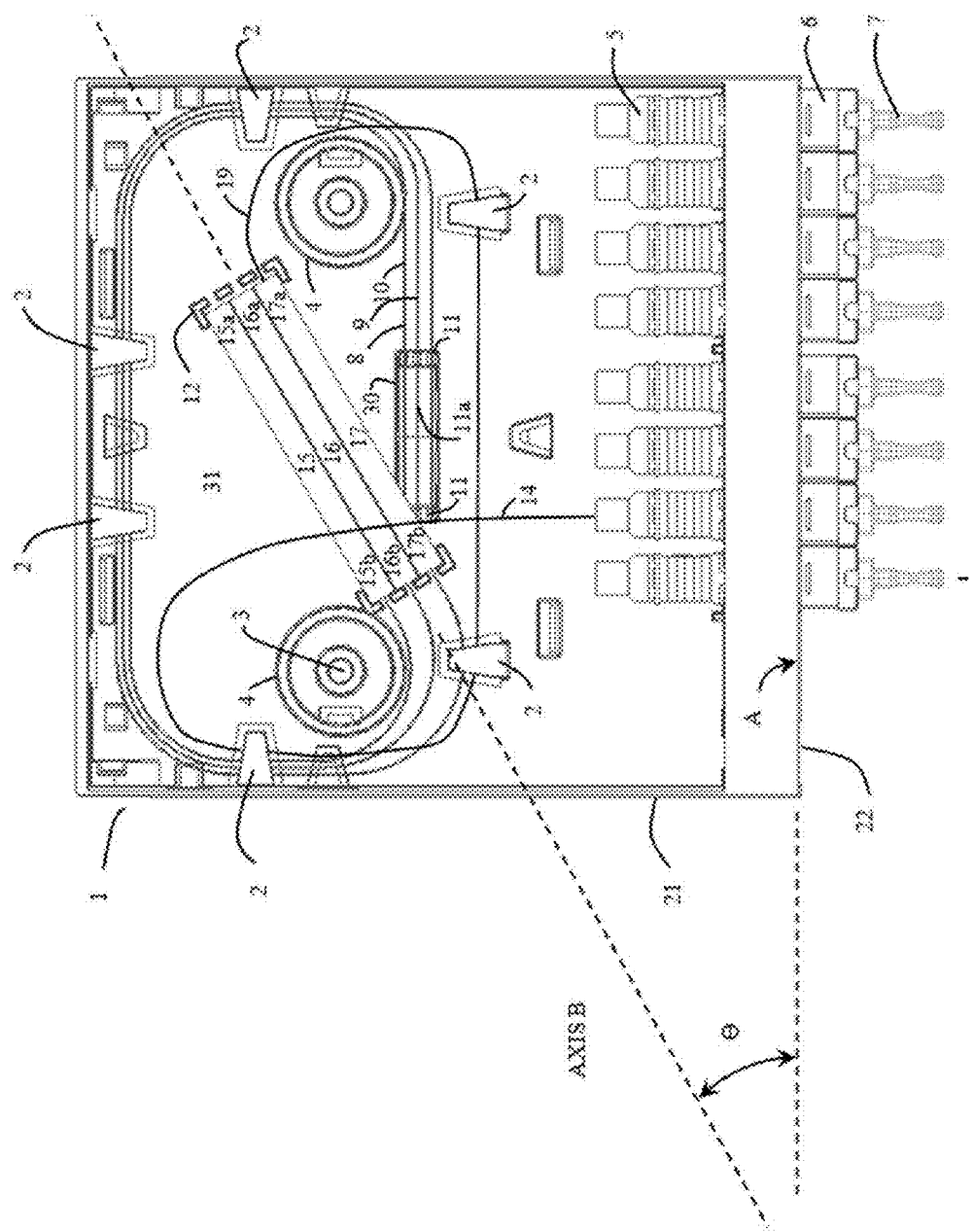
FIG. 2 shows a side view of a multiple fiber connector module of the invention.
Figure 3:
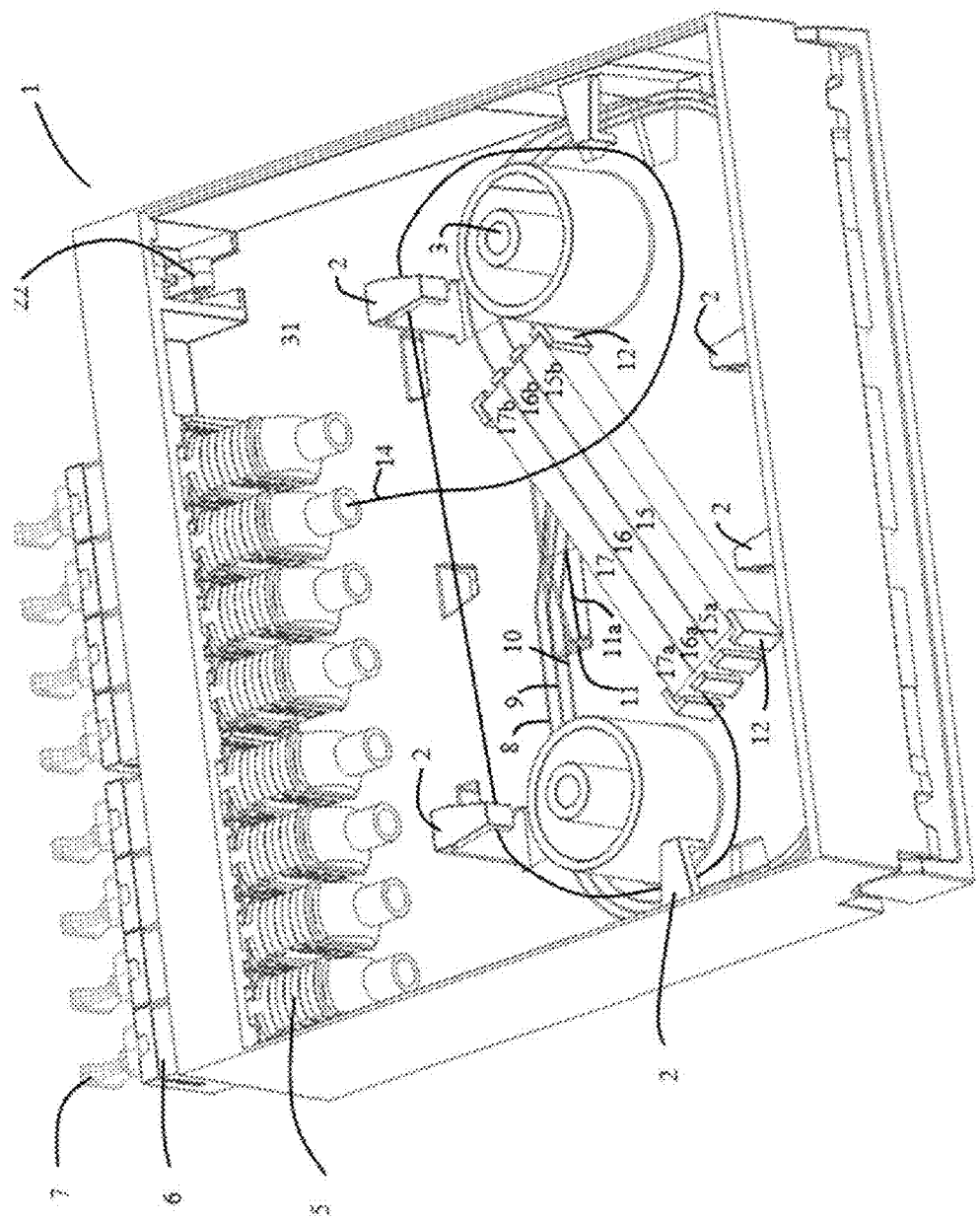
FIG. 3 shows a rear isometric view of a multiple fiber connector module with upper lid removed with an interior view shown for reference.

FIGS. 2 and 3 show plan and isometric views, respectively, of another embodiment of a multiple fiber connector version of the IDEAA modules 1 (the splitter compartment cover not shown). One of the advantages of the IDEAA module is that it offers the smallest footprint package. This particular embodiment is a 3×96 splitter IDEAA.

FIGS. 2 and 3 show the splitter compartment 31 side of the IDEAA module 1. The IDEAA module includes a housing 21, which can be made of plastic, or any other rigid material. The housing has a splitter compartment 31 and a splice compartment 29. The IDEAA includes a splitter holder 12 that holds a plurality of splitters. In this particular embodiment, the splitter holder 12 holds three splitters 15, 16 and 17. The splitters 15, 16 and 17 can be any optical device that splits an input optical signal into a plurality of output signals. Examples of splitter devices include, but are not limited to, planar lightwave circuit (PLC) or fused biconal taper (FBT) splitters. Each of the splitters 15, 16, and 17 has an input end 15a, 16a, and 17a and an output end 15b, 16b and 17b. The splitter holder 12 is positioned such that the longitudinal axis B of the splitters that goes through the input and output ends of the splitters has an angle θ with respect to the front edge A of the apparatus. In a preferred embodiment, angle θ is approximately 20 to 70 degrees, and preferably between 30 and 40 degrees. By angling the splitters, manufacturers can use splitters made in longer cases or conventional single mode fiber without violating single mode fiber bending limits.

Three input fibers 8, 9 and 10 from the splitter compartment 29 (shown in FIG. 4) go through fiber pass through 30 holes 11. The fibers are secured individually in grooves 11a in the fiber pass through 30 in order to insulate the input fiber from mechanical damage. After entering the splitter compartment, the fibers go around one of the fiber bend radius guides 4 and into the inputs ends 17b, 16b and 15b of respective splitters 15, 16 and 17. In this embodiment, thirty two output fibers exit the output end of each of the splitters. Item no. 19 represents thirty two of the output fibers outputting splitter 17. The fibers outputting splitters 15 and 16 are not shown. All of the fibers that output the splitters are bent around the fiber bend radius guides 4 in one or more loops. These fibers are organized and held in place by several routing/retaining tabs 2. The output fibers are then input to a multiple fiber connectors 5, such as the new FuseConnect MPO connectors. However, other multiple fiber connectors could be used. In this particular embodiment, twelve output fibers are input into each multiple fiber connector. Thus, the embodiment shown in FIGS. 2 and 3 have 96 output fibers. Item no. 14 represents twelve output fibers going into the one of the multiple fiber connectors 5. Commonly known methods of fiber management may be used to organize the fibers, such as ribbons and loose tubes, the multiple fiber connectors 5 are connected to respective multiple fiber adapters 6 that are mounted in the housing 21.

Holes 3 go through the apparatus 1 and can be used as mounting bosses that can be used to mount the apparatus or to connect several apparatuses together.

Figure 4:
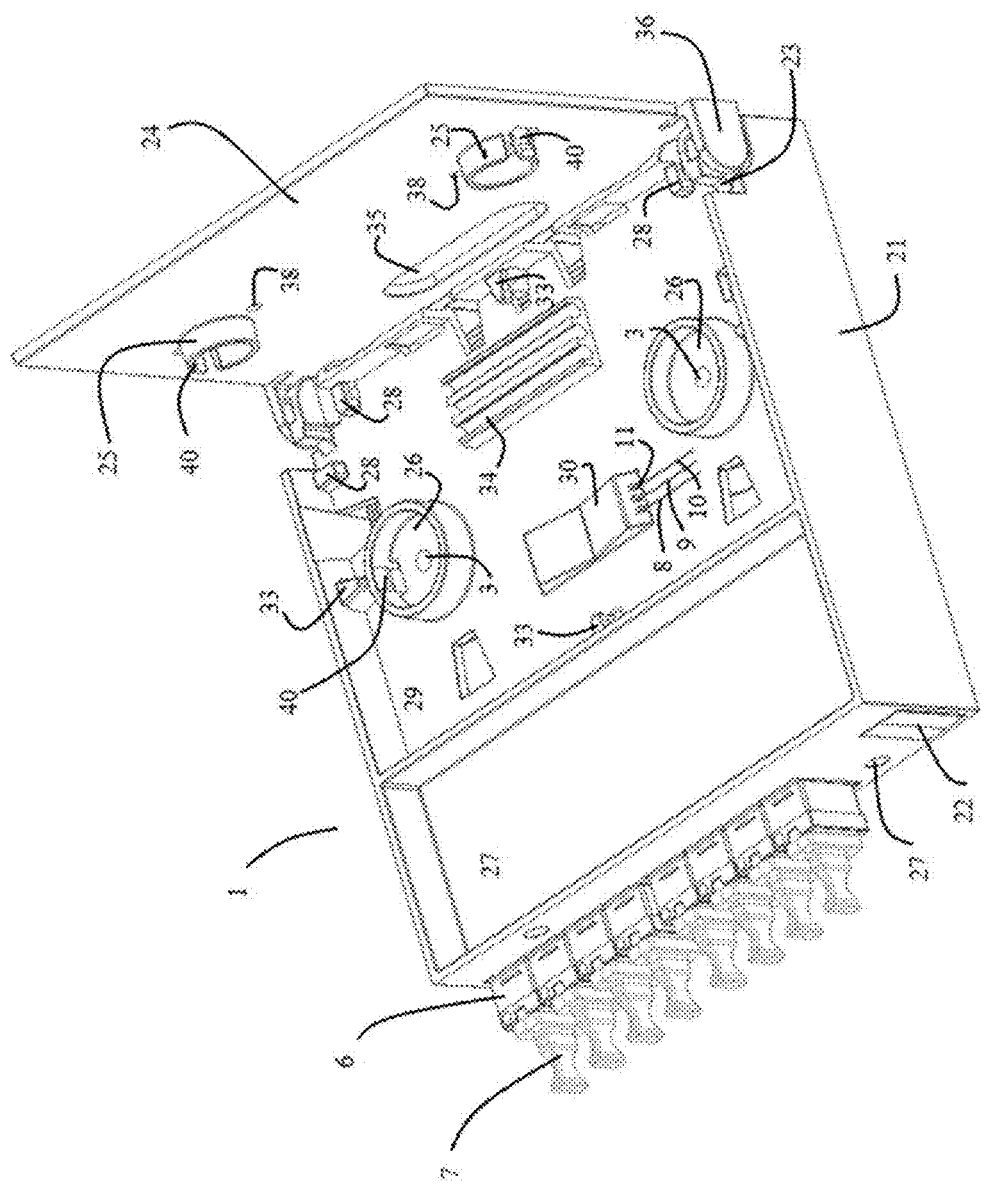
FIG. 4 shows a rear isometric view of a multiple fiber connector module with two upper-most modules suppressed.

FIG. 4 shows an isometric view of the splice tray side of the IDEAA 1. This view shows the splice tray compartment 29 with the hinge plate 24 at a ninety degree angle. The splice tray compartment cover 37 is not shown in this figure, but is shown in FIG. 5. Non-connectorized provider fibers (not shown) from a provider would enter the apparatus at one of the openings 23. The provider fibers may be secured to the apparatus 1 by using one or more of the tie downs 28. The provider fibers are spliced to the input fibers 8, 9 and 10, by known conventional splicing methods, and then the splice (not shown) is secured in the splice chip/sleeve holder 34. The input fibers are then routed around the fiber bend radius guides 26 before passing through holes 11 in the fiber pass through 30, where they enter the splicer compartment 31. Portions of input fibers 8, 9 and 10 are shown entering the holes 11 in the fiber pass through 30.

Excess fiber can be maintained in either or both of the splitter or splice compartments so that if a fiber breaks, a new splice can be performed.

The hinge plate 24 is removably and rotatably attached to the housing 21 by a hinge mechanism 36. The hinge plate 24 can be used to mount the apparatus in various manners and enclosures. The IDEAA module 1 also has recesses 26, into which hinge plate stand-offs 25 can be inserted. The recesses and stand-offs prevent mounting devices, such as a screw or bolt from interfering with the opening and closing of the hinge plate 25. There are also tabs 40 on the hinge plate that allow the hinge plate to remain in a closed position.

The IDEAA module 1 also includes several mounting holes 27 that can be used to attach structures that can allow the apparatus to be mounted in various enclosures or racks.

FIGS. 5A and 5B show a schematic diagram of an exterior distribution pedestal cabinet 110. In the current embodiment, input is with 12F or 24F feed cable 200. The feeder cables 200 enters an exterior distribution pedestal cabinet 110 from a bottom portion of the cabinet 110.

There can be at least two different configurations of exterior distribution pedestal cabinet feeder cables 200. First, the feeder cables 200 can be pre-terminated. That is, the feeder cable 200 is broken out into individual fiber strands that are terminated. Second, the feeder cable can be spliced to pigtails, which are individual optical fibers with fiber optic connectors, in general. However, other cable fiber counts are possible. For example, field termination with mechanical splice or fusion splice connectors can also be used.

The pre-terminated individual feeder cables 200 or pigtailed feeder cables 200 are routed to the following locations within the exterior distribution pedestal cabinet 110 as shown in FIGS. 5A and 5B. First, the pre-terminated individual feeder cables 200 can be inserted into IDEAA modules 1. In the current embodiment, the individual pre-terminated feeder fiber is connected to up to 32 distribution fibers via the 1×32 IDEAA module 1 as shown. This architecture is consistent with Fiber-to-the Premises (FTTP) PON architectures. The IDEAA module 1 has been described in detail above and through FIGS. 1-4. Second, the feeder cables 200 can be inserted into connector holders 120. The pre-terminated feeder fibers 200 inserted into the connector holder 120 are stored for future use. Third, the pre-terminated individual feeder fiber is connected as pass-throughs by a pass-through connection point 130.

In the FTTP PON architecture, the pass-throughs describe a fiber optics design where an individual terminated feeder fiber is connected with one individual distribution fiber. For example, to support three (3) 1×32 IDEAA modules 1 shown in FIG. 5, three fibers are needed. The other nine (9) fibers are unused. The nine (9) "unused" feeder pigtails are routed to the pass through connection point. Sequentially, nine (9) F2 or distribution cables 300 are routed to the pass through connection point and directly connected to the feeder cables 200. These distribution fibers would typically be connected to other cabinets and therefore, the pass-through feature is particularly important to service providers in rural areas.

In a related art pedestal fiber distribution hub, a separate jumper is needed to connect the feeder and distribution cables. Based on common PFDH design, making a pass-through connection may reduce the number of potential customer a Telco could service using a particular PFDH.

Similar to the feeder cables described above, there are two configurations for exterior distribution pedestal cabinet distribution cables. The distribution cables 300 can be broken out into individual fiber strands that are terminated with fiber optic connectors (pre-terminated). The distribution cables can also be individual optical fibers with fiber optic connectors (spliced into pigtails). However, other cable fiber designs are possible. For example, field termination with mechanical splice or fusion splice connectors can also be used.

Having the feeder 200 and distribution cables 300 of the exterior distribution pedestal cabinet 110 discussed above provide a different approach from the one used in related art FDHs and fiber distribution splitters. The first difference is that the IDEAA module 1 has an input and output bulkhead adapters where the fiber distribution splitters have input and output pigtails. The second difference is that in the exterior distribution pedestal cabinet 110, the feeder cable 200 and the distribution cable 300 can be either directly connected to the IDEAA module 1 or directly connected at the pass through. In the related art FDHs, the fiber distribution splitter pigtails are connected to the input and distribution fields. Thus, a separate jumper would be required to directly connect the input and distribution fields. Also, use of IDEAA modules enables installation with pre-existing feeder and distribution cables 200 and 300.

Although a fiber distribution splitter may have one package size, there are multiple cabinet fiber distribution hubs and pedestal fiber distribution hubs specific variants with differing pigtail lengths for efficient fiber routing. This approach will force an end-user to stock several different variants of fiber distribution splitters for its cabinet fiber distribution hubs and pedestal fiber distribution hubs. With the exterior distribution pedestal cabinet 110 in place, the end user will not be required to carry different splitters and will not be required to have separate jumpers to connect between feeder cables 200 and distribution cables 300.

Figure 6:
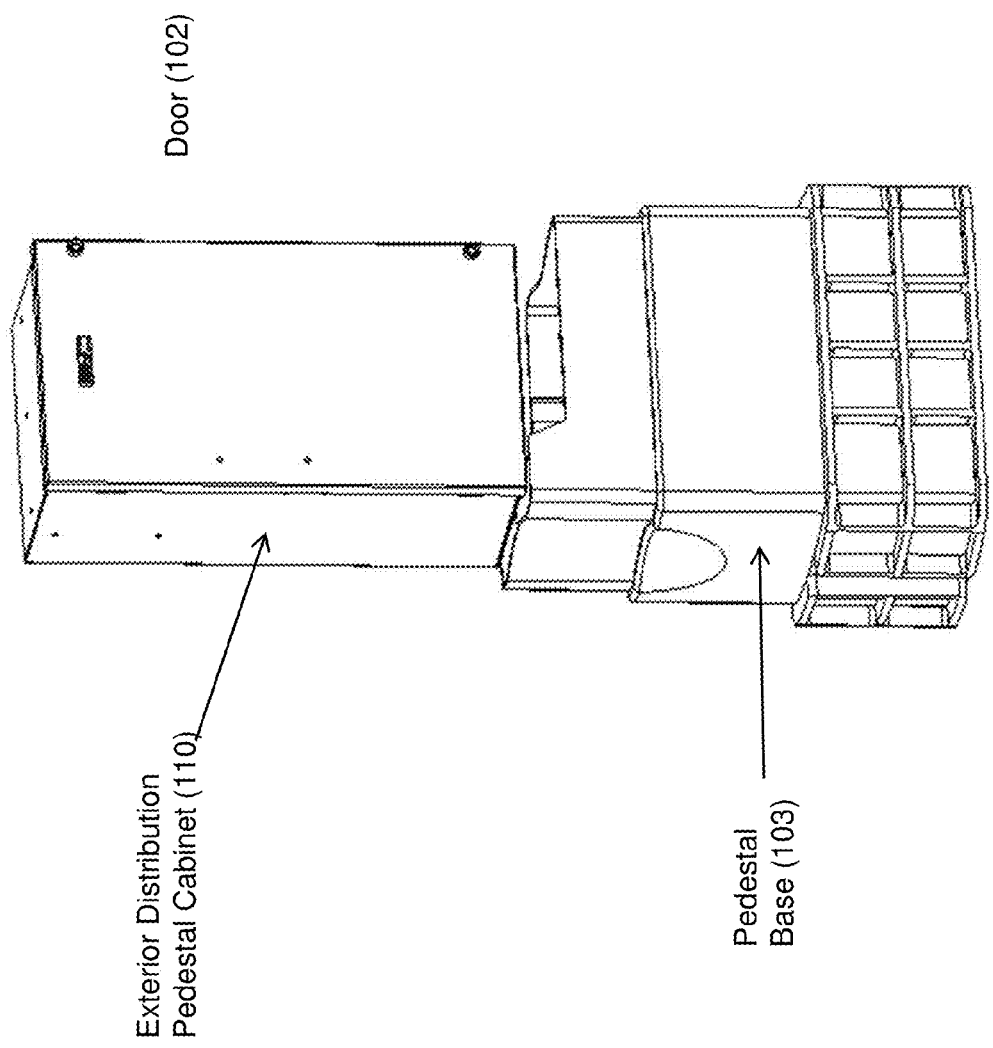
FIG. 6 shows an isometric view of an exterior distribution pedestal cabinet installed on a pedestal base.
Figure 7:
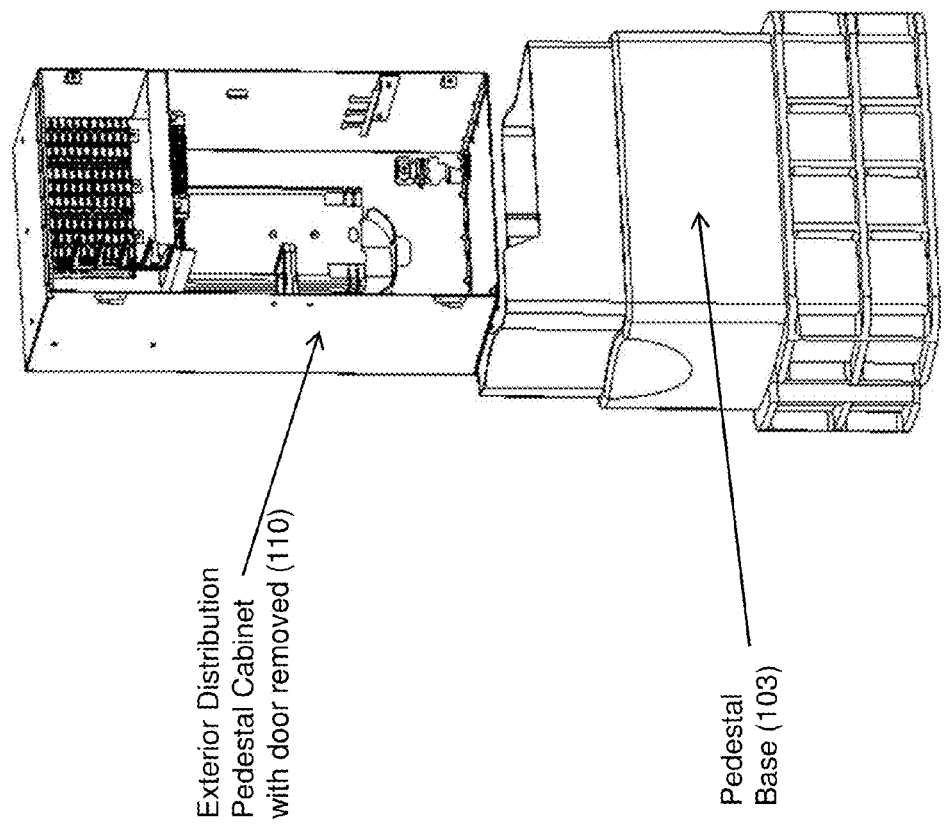
FIG. 7 shows an isometric view of an exterior distribution pedestal cabinet with door removed installed on pedestal base with an interior view shown for reference.

FIGS. 6 and 7 show an exterior distribution pedestal cabinet 110 installed on a pedestal base 103. The exterior distribution pedestal cabinet 110 in accordance with a preferred embodiment mounts on top of the pedestal base 103. The feeder and distribution cables 200 and 300 are routed to the bottom of the exterior distribution pedestal cabinet 110 via the pedestal base 103. The exterior distribution pedestal cabinets 110 are designed to fit into the most common pedestal base 103 deployed in the U.S. (i.e. Emerson and Channel)

The exterior distribution pedestal cabinet 110 in accordance with a preferred embodiment administers connections between fiber optic cables and passive optical splitters in the outside plant (OSP) environment. These cabinets 110 are used to connect feeder 200 and distribution cables 300 via IDEAA modules 1 providing distributed service in a FTTP network application. The exterior distribution pedestal cabinet 110 is designed to accommodate a range of sizes and fiber counts and support factory installation of pigtails, fan-outs and splitters.

Also, the cabinet 110 in accordance with a preferred embodiment provides environmental and mechanical protection for cables, splices, connectors and passive optical splitters. These exterior cabinets provide the necessary protection against rain, wind, dust, rodents and other environmental contaminants. At the same time, they remain lightweight for easy installation, and breathable to prevent accumulation of moisture in the unit. An aluminum construction with a power coat finish also provides a balance between cost, weight and corrosion resistance. However, other materials also can be used to meet the criteria. The inside of the cabinet 110 is accessible through secure door 102 that are locked with standard tool or pad-lock.

Figure 8:
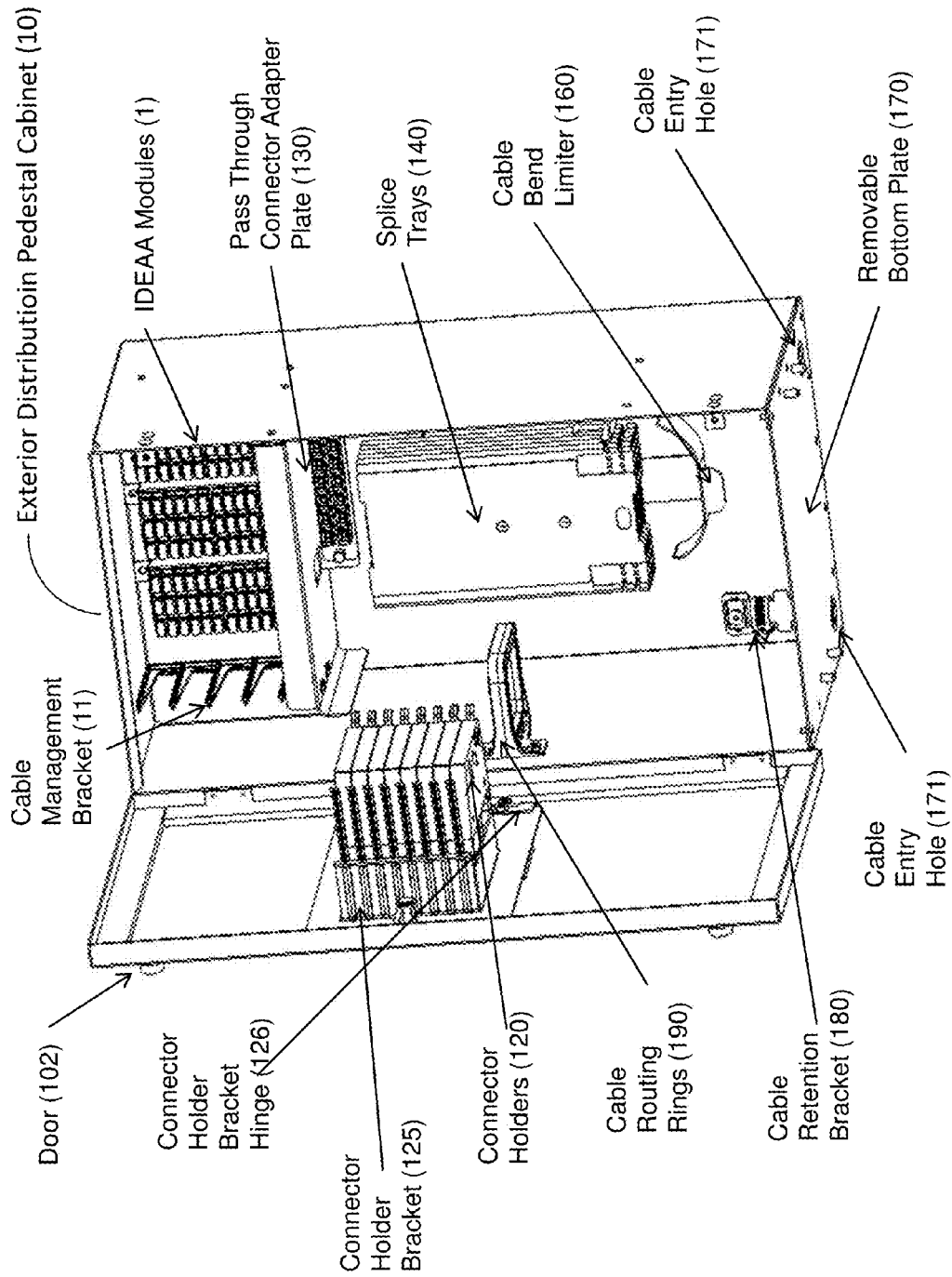
FIG. 8 shows an isometric view of an exterior distribution pedestal cabinet interior.
Figure 9:
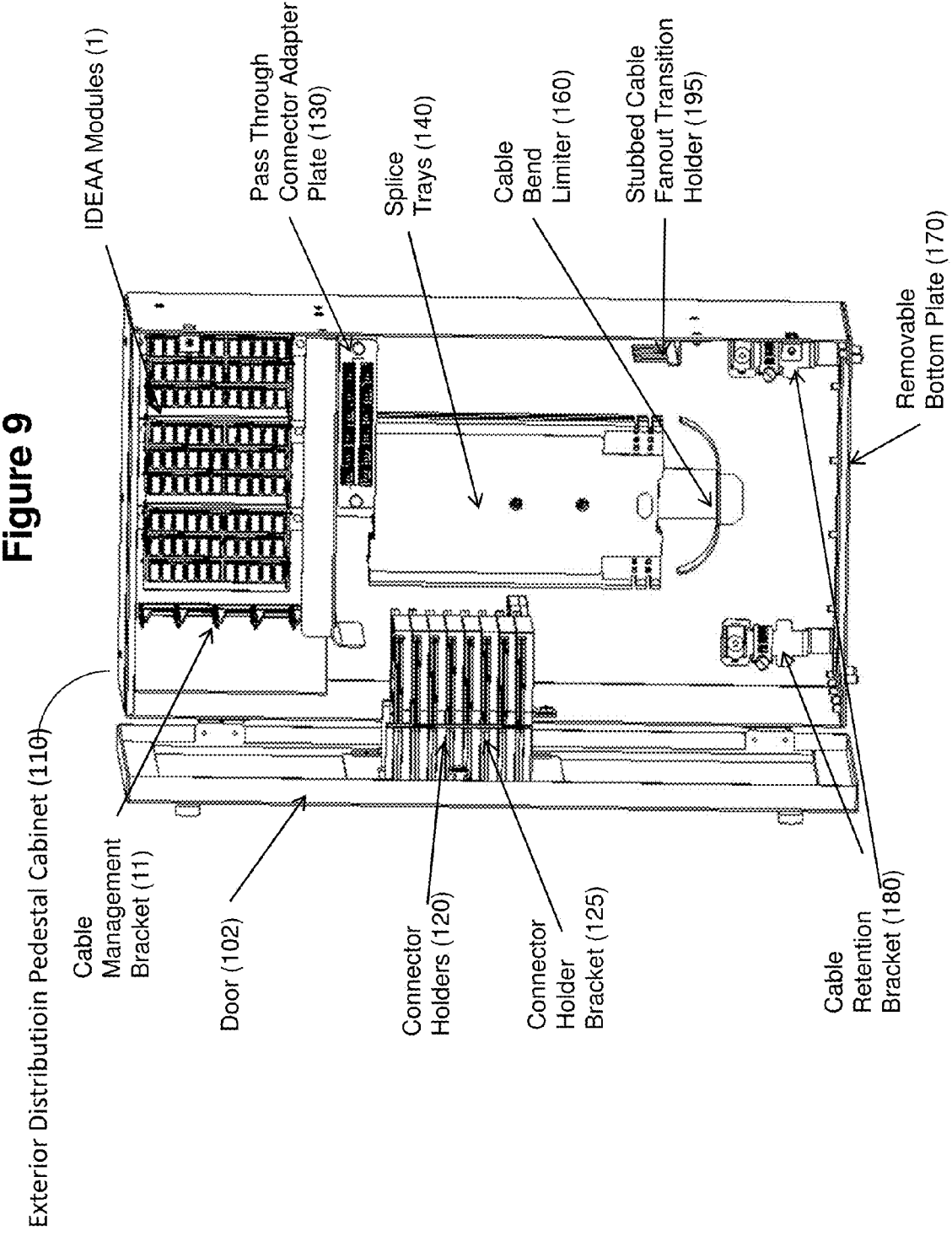
FIG. 9 shows another isometric view of an exterior distribution pedestal cabinet interior.

FIGS. 8 and 9 illustrate a view of the internal components of an exterior distribution pedestal cabinet 110 in accordance with a preferred embodiment. The exterior distribution pedestal cabinet 110 in accordance with a preferred embodiment can be configured in a number of different ways to support fiber cable termination and interconnection to passive optical splitters. The configuration illustrated in the preferred embodiment provides for a cable management bracket 11 where the IDEAA modules 1 are mounted on, a pass through connector adapter plate 130, a splice tray 140, a cable bend limiter 160, a cable routing ring 190, a cable retention bracket 180 and a removable bottom plate 170.

Splice tray 140 is centrally mounted on splice tray mounting bracket (not shown) with bend limiters 160. The connector pass through connector adapter 130 is mounted over the splice trays 140 and below IDEAA modules 1. The cable retention bracket 180, the cable bend limiter 160 and the cable router ring 190 are used to retain cable and minimize chances that cables 200 and 300 will be routed in a manner that the cables have bending losses. The cable retention bracket 180 is also used to prevent cable from being pushed in or pulled out.

Stubbed cable fan-out transition holder 195 provides a time saving benefit for manufacturing associates and field service personnel. For manufacturing personnel, it is easy to position the breakout transitions within the cabinet, ensuring the optimal placing of the terminated fibers for fiber routing. For field technicians, it is similarly easy to position the breakout transitions with in the cabinet if section of cable need to be replaced.

Figure 10:
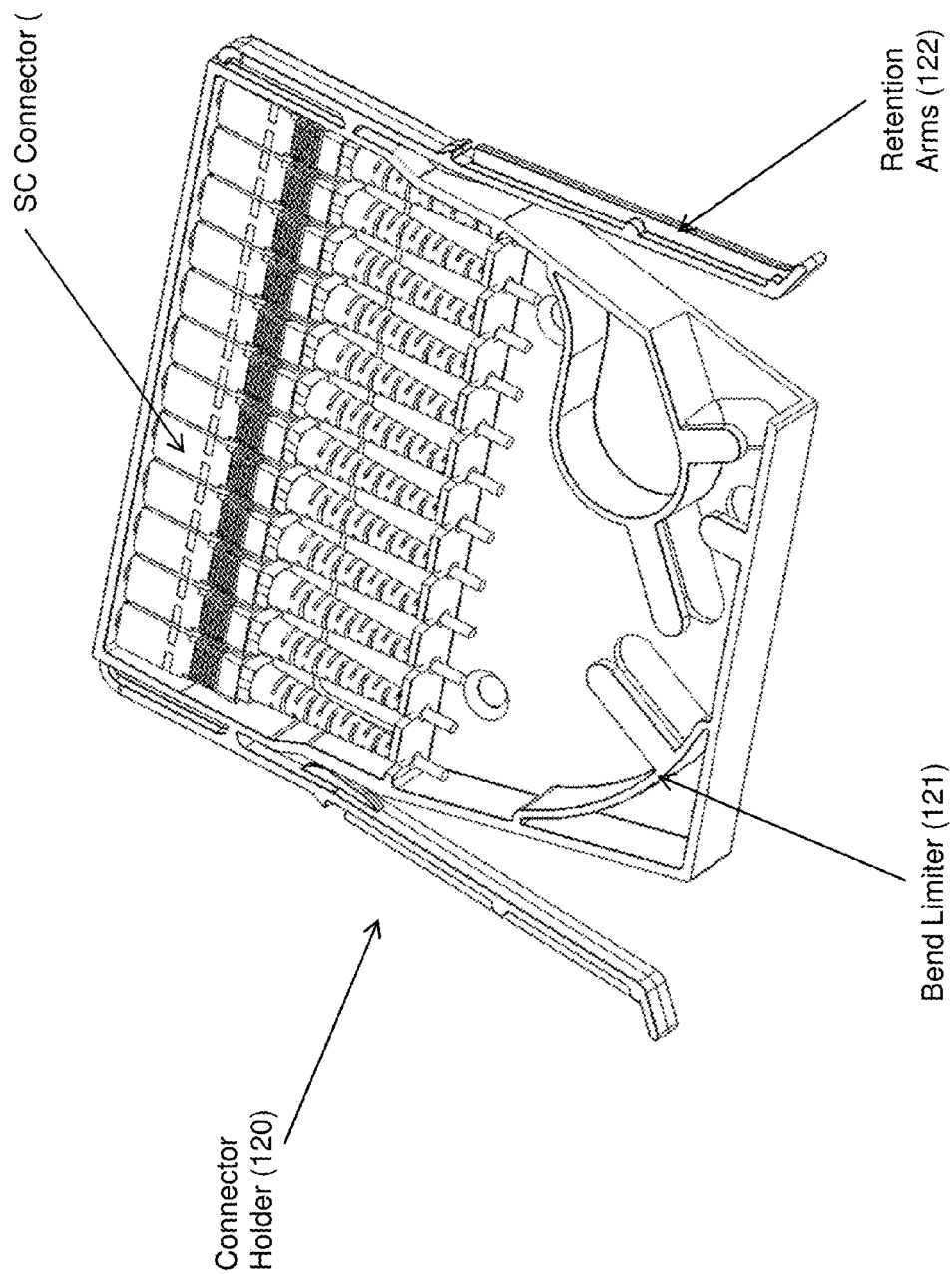
FIG. 10 shows a rear isometric view of a connector holder.
Figure 11:
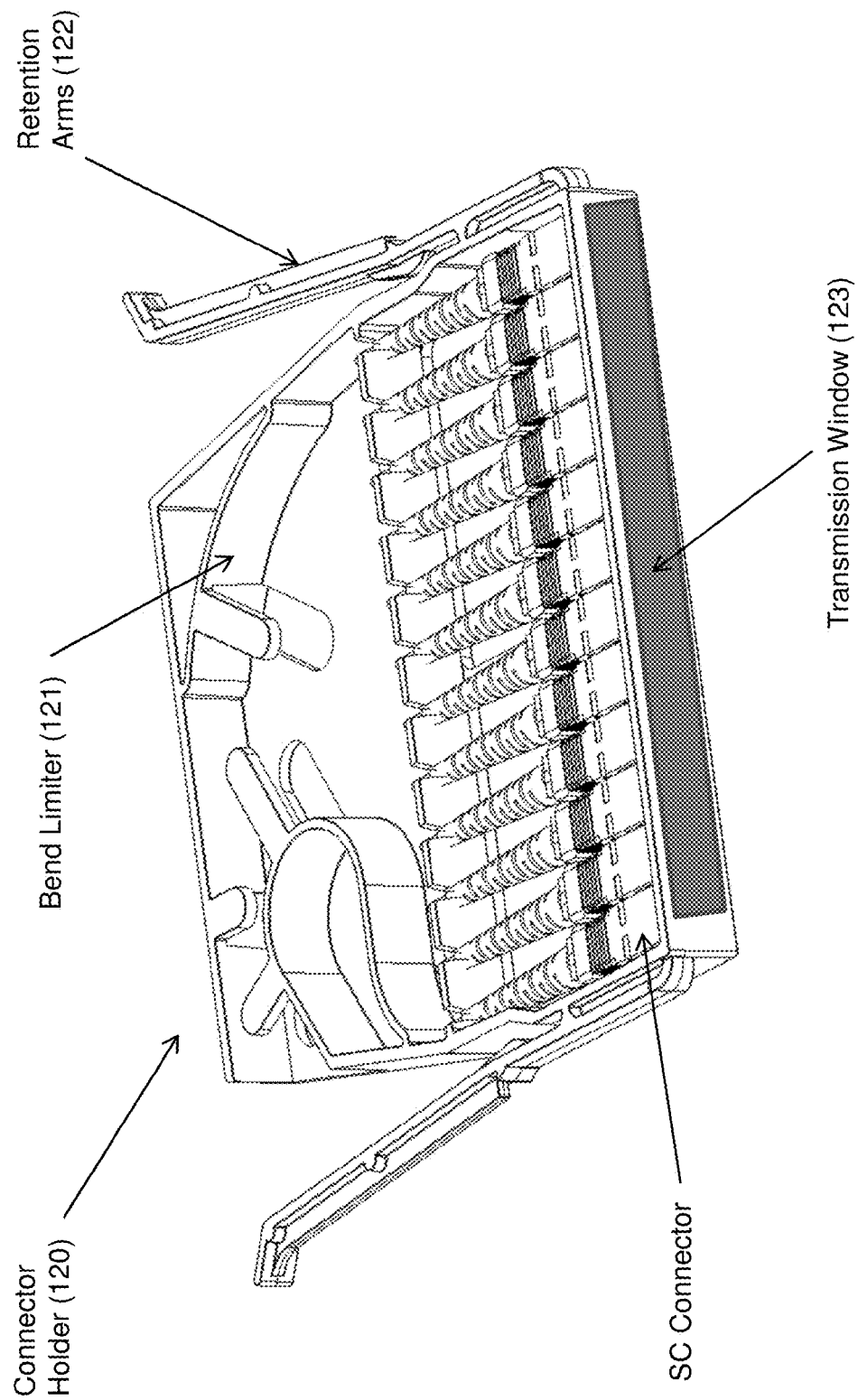
FIG. 11 shows a front isometric view of a connector holder.

FIGS. 10 and 11 show a connector holder 120 which stores up to twelve (12) subscriber connector (SC) style connectors. In the exterior distribution pedestal cabinet 110, unused terminated feeder and distribution cable fibers are stored in a connector holder 120.

The connector holder 120 shown in FIG. 10 offer advantages compared to related art connector holders. First, the connector holder 120 has a dust cap built into the end. This way a technician is not required to store spare dust caps in the cabinet or bring dust caps with him. This feature is important when a Telco disconnects service by unplugging a connector from the IDEAA module 1. This connector can then be reinstalled in the connector holder 120, inserting the ferrule into the ferrule grip.

The connector holder 120 also includes a transmission window 123, which allows the technician in the field to easily verify continuity in the specific feeder or distribution feeder fiber 200. The connector holder 120 of the exterior distribution pedestal cabinet 110 allows a field technician to conduct a simple "red-light" continuity check and visual inspection of the feeder and distribution cable connectors. In the event of connector failure, this connector is readily accessible for repair and cleaning.

Connector holders 120 in accordance with a preferred embodiment are installed in a connector holder bracket 125 that is mounted on the door 102. When the connector holder 120 is installed in the connector holder bracket 125 on the connector holder bracket hinge 126, the connector holder bracket hinge 126 can be swung to an inspection position, making it easier of field technicians to identify fibers during a red-light inspection and provide a qualitative assessment of feeder or distribution fiber condition.

Figure 12:
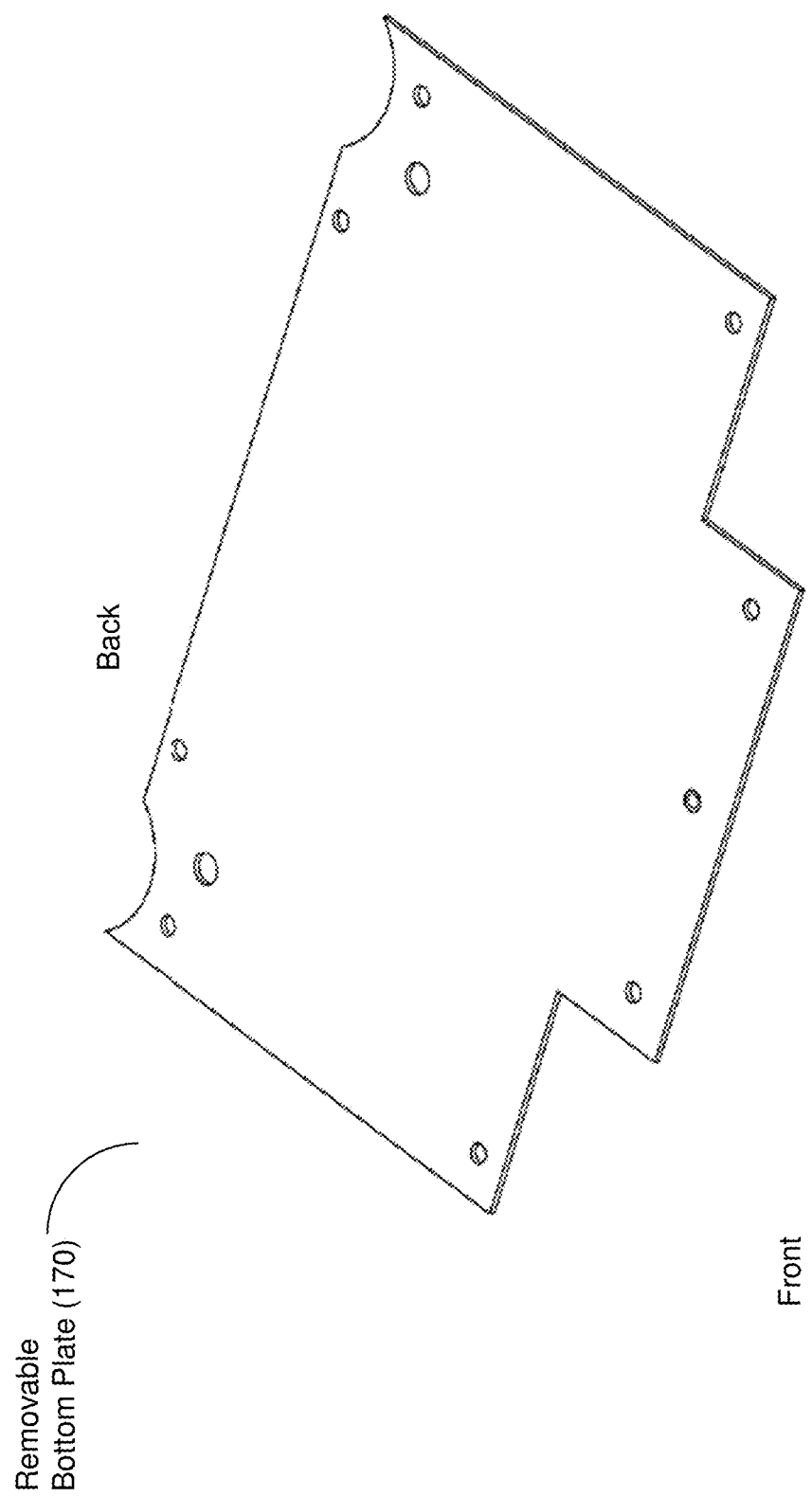
FIG. 12 shows an isometric view of removable bottom plate.

The exterior distribution pedestal cabinet 110 in accordance with a preferred embodiment has a removable bottom plate 170. The removable plate is shown in FIG. 12. The removable plate 170 is used to make installation on base pedestals easier. Often, the feeder cables 200 are already installed in ducting and are sticking out of the ground prior to the base pedestal 103 installation. With the bottom plate removable, it is easier to get the feeder cables 200 on the cabinet 110. Moreover, it is common in most base pedestals 103 for a section of feeder and distribution cable 200 and 300 to be provisioned to the base of the pedestal cabinet 110. The cables are typically very stiff and can be difficult to route to the ports in the bottom of the cabinet 110. The removable bottom plate and cutouts 175 in the cabinet frame make it easier for field personnel to position the cable on the interior of the cabinet, and then seal the bottom portion of the cabinet 110.

Figure 13:
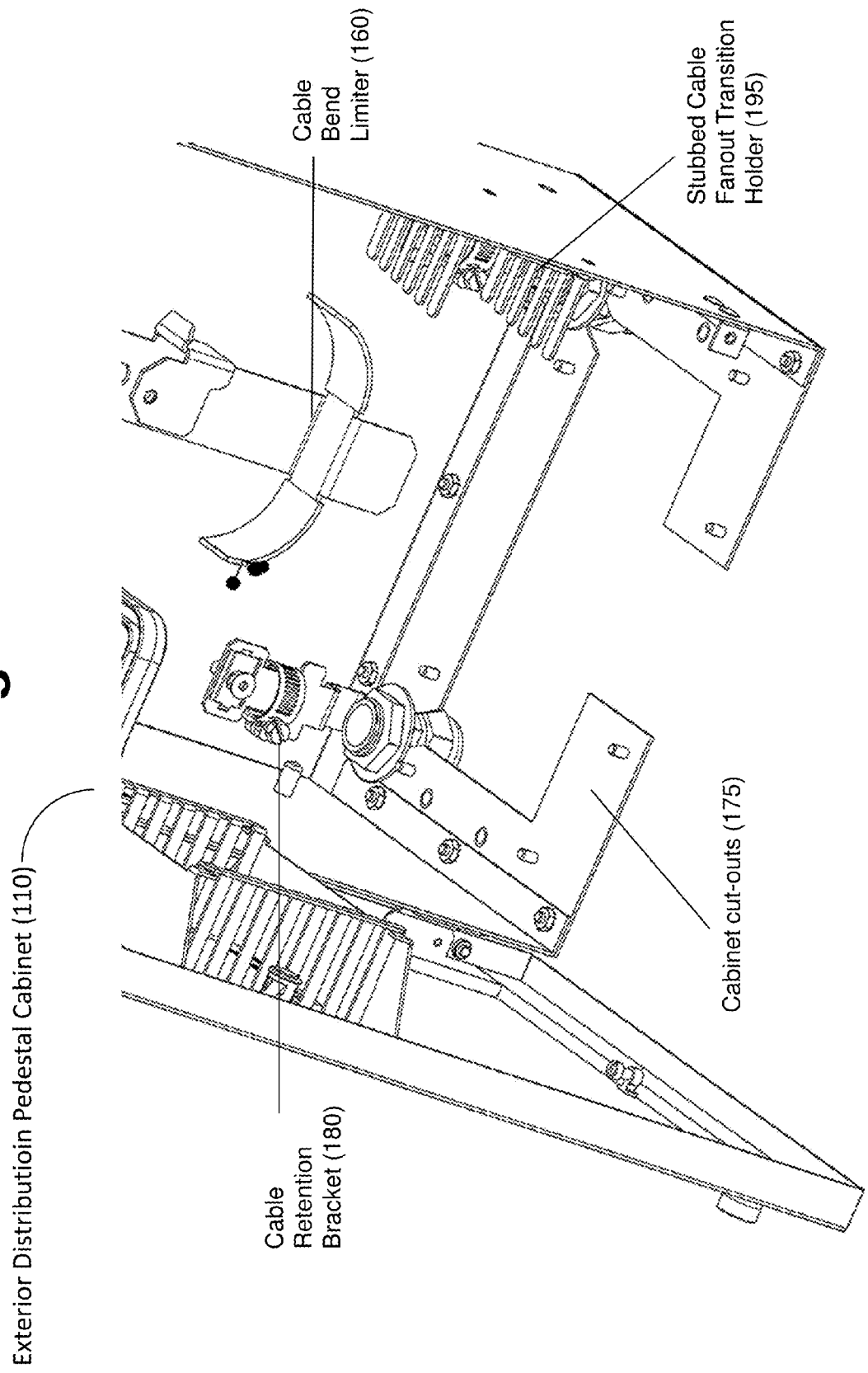
FIG. 13 shows a front isometric view of an exterior distribution pedestal cabinet interior with a removable bottom plate removed.

When the removable bottom plate 170 is removed as shown in FIG. 13, the cabinet formed bottom has channel slots to route the feeder and distribution cables 200 and 300 to the cable retention brackets 180. The removable bottom plate 170 can then be reinstalled on the bottom portion of the exterior distribution pedestal cabinet 110.

FIG. 14 shows an exterior distribution pedestal cabinet 110 with removable bottom plate attached to the cabinet 110. In addition to being removable, the removable bottom plate 170 provides dust and water seal for the cabinet 110. Also, different design of removable bottom plate 170 can be used for different number of feeder and/or distribution cables 200 and 300.

FIG. 15 shows a door spring latch 500, which provides a means a low cost means to hold an outside plant cabinet door in a fixed position while utilizing a minimum of the cabinet interior volume. FIG. 15 shows an exterior distribution pedestal cabinet 110 shown with open door 102. In accordance with a preferred embodiment, the spring latch 500 has been selected so that the door open position corresponds to zero extension position of the spring latch. In this position, the spring (which can not compress) holds the door open against in force which ties to shut the door 102. The spring latch 500 resists any motion that ties to force the door beyond the pre-assigned open position. When the door is opened, beyond the maintenance position, the spring stretches, and retracts to return to the zero extension position.

When the field technician has completed required maintenance or servicing, the field technician applies a lateral force to the midpoint of the spring latch 500 while shutting the door. This lateral force is applied away from the door hinge. The spring latch 500 bends as the door is closed.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation.

What is claimed:

1. An exterior distribution pedestal cabinet comprising:
an enclosure having a top, a bottom and first and second sides extending between the top and the bottom;
a door disposed on a front side of the enclosure;
a cable management bracket within the enclosure;
a plurality of splitter modules mounted within the enclosure at the cable management bracket;
a connector holder bracket;
a plurality of connector holders mounted at the connector holder bracket; and
a pass-through connector adaptor plate,
wherein at the bottom of enclosure, the enclosure comprises a bottom plate comprising:
cabinet cut-outs forming outer portions of the bottom plate and fixedly attached to the enclosure; and
a removable bottom plate removably attached to the cabinet cut-outs, and
wherein the cabinet cut-outs include a cable entry hole through which feeder cables from a pedestal base is inserted into the exterior distribution pedestal cabinet the cable entry hole spaced apart from the removable bottom plate.

2. The exterior distribution pedestal cabinet of claim 1, wherein each of the plurality of splitter modules comprises:
a housing with a splitter compartment and a splicer compartment;
a plurality of fiber adapters attached to a wall of the housing;
a plurality of fiber connectors connected to the plurality of fiber adapters;
an optical splitter in the splitter compartment of the housing;
an input fiber optically connected to the optical splitter; and
a plurality of output fibers optically connected to the optical splitter and the plurality of fiber connectors.

3. The exterior distribution pedestal cabinet of claim 1 further comprising a cable retention bracket.

4. The exterior distribution pedestal cabinet of claim 1 further comprising a stubbed cable fanout transition holder.

5. The exterior distribution pedestal cabinet of claim 1 further comprising a connector holder bracket hinge.

6. The exterior distribution pedestal cabinet of claim 5, wherein the connector holder bracket hinge is rotatably attached to the door.

7. The exterior distribution pedestal cabinet of claim 6, wherein the connector holder bracket attached to the connector holder bracket hinge.

8. The exterior distribution pedestal cabinet of claim 5, wherein the connector holder is mounted within the door at the connector holder bracket.

9. The exterior distribution pedestal cabinet of claim 1, wherein the connector holder bracket is attached to the door.

10. The exterior distribution pedestal cabinet of claim 1, wherein the pass through connector adaptor plate is disposed below the plurality of the splitter modules.

11. The exterior distribution pedestal cabinet of claim 1, wherein the connector holder comprises a transmission window.

12. The exterior distribution pedestal cabinet of claim 1 further comprising a spring latch connecting the enclosure and the door.

13. The exterior distribution pedestal cabinet of claim 12, wherein the spring latch has a zero extension position of the spring at a opened door position.

14. The exterior distribution pedestal cabinet of claim 13, wherein the spring latch bends when the door closes.

* * * * *